Patented Jan. 18, 1949

2,459,767

UNITED STATES PATENT OFFICE 2,459,767

MANUFACTURE OF CHLOROFLUORO METHANES

John D. Calfee, Manhasset, N. Y., and Lee B. Smith, Woodbridge, N. J., assignors to Allied Chemical & Dye Corporation, a corporation of New York No Drawing. Application March 19, 1946,
Serial No. 655,597

11 Claims. (Cl. 260—653)

This invention relates to manufacture of dichlorodifluoromethane, $CCl_2F_2$, and carbon tetrachloride, $CCl_4$, from chlorine and ethylidene fluoride, $CH_3CHF_2$, readily available raw materials.

Dichlorodifluoromethane is ordinarily made by a relatively cumbersome process involving the fluorination of carbon tetrachloride with hydrogen fluoride in the presence of antimony fluoride catalyst. Carbon tetrachloride is customarily produced by chlorinating carbon disulfide, a procedure which introduces the difficult problem of handling and recycling precipitated sulfur which in turn is utilized to make more carbon disulfide from a source of carbon such as charcoal or methane. The carbon tetrachloride thus obtained must be carefully purified to remove the last traces of sulfur.

The principal object of this invention is provision of improved processes by which it is possible to prepare, from chlorine and ethylidene fluoride raw materials, carbon tetrachloride and dichlorodifluoromethane under conditions such that exhaustive chlorination and so-called chlorinolysis (disunion of carbon atoms by the action of chlorine) may be accomplished without formation of excessive quantities of undesired by-products such as $C_2Cl_6$ and without giving rise to loss of fluorine by splitting out of HF.

This invention comprises the discovery that if the ethylidene fluoride is preliminarily at least monochlorinated, e. g. to 1,1,1-chlorodifluoroethane, as by actinic radiation, there is formed an intermediate product which may be thereafter exhaustively chlorinated and subjected to chlorinolysis by the thermal method, that is, by externally heating such intermediate product in the presence of the desired amounts of chlorine at relatively high temperatures. This discovery facilitates manufacture of carbon tetrachloride and dichlorodifluoromethane from readily available ethylidene fluoride raw material by an easily controlled, commercially feasible process involving (a) preliminary formation of an at least monochlorinated intermediate product, e. g. by actinic radiation reaction of chlorine and ethylidene fluoride, and (b) subsequent exhaustive chlorination and chlorinolysis of such intermediate product by thermal chlorination. From another viewpoint, the invention comprises the discovery that an at least monochlorinated ethylidene fluoride may be exhaustively chlorinated and subjected to chlorinolysis by heating, in the presence of an adequate amount of chlorine, at temperatures in the range of 750 to 900° C. to effect production of carbon tetrachloride and dichlorodifluoromethane without the aforementioned splitting out of HF and the attendant loss of HF and the formation of relatively large amounts of undesired by-products.

In customary practice of a preferred embodiment of this invention, using ethylidene fluoride as the raw material, the improved process is carried out in two stages, the first of which may be represented by the following equation:

Stage 1 (Equation 1)

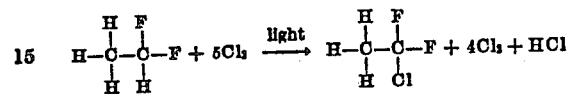

With respect to production of $CF_2Cl_2$ and $CCl_4$, the second stage may be indicated by:

Stage 2 (Equation 2)

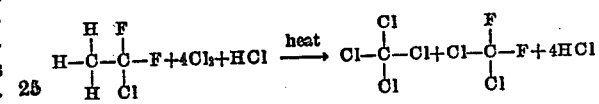

The invention comprises heating an at least monochlorinated 1,1-difluoroethane at temperature in the range of 750–900° C. in the presence of at least sufficient chlorine to form dichlorodifluoromethane. More particularly, the invention comprises at least monochlorinating ethylidene fluoride to form a resulting intermediate product containing at least one chlorine atom, and heating such resulting product at temperatures in the range of 750–850° C. in the presence of at least 3.5 molecular proportions of chlorine to thereby form dichlorodifluoromethane and carbon tetrachloride simultaneously in good yields.

In the practice of the preferred embodiments of the present invention, the at least monochlorination of ethylidene fluoride in Stage 1, preferably formation of 1,1,1-difluorochloroethane, is effected by actinic radiation. The reason why monochlorination by actinic radiation may be used so advantageously in conjunction with thermal chlorination (Stage 2), to provide a fast operating easily controllable overall process for making dichlorodifluoromethane and carbon tetrachloride, is that initiation of the chlorination operation by actinic radiation avoids the previously referred to splitting out of HF and undesirable side reactions characteristic of direct thermal chlorination of ethylidene fluoride.

Stage 1

With respect to production of 1,1,1-difluorochloroethane, it has been found that when ethylidene fluoride and chlorine are subjected to the action of actinic radiation (to the action of any light which effects chemical change) there is substantially immediately produced a gaseous reaction mixture comprising a recoverable mixture of reacted materials containing by weight a predominating amount of 1,1,1-difluorochloroethane. Under moderately favorable conditions of operation, such recoverable mixtures of reacted materials may contain by weight not less than 80–85% of 1,1,1-difluorochloroethane, and yields of this monochlorinated product may be 60% and higher. The foregoing is true whether the reaction may be effected in the presence of less than one, one, or substantially more than one molecular proportion of chlorine. The resulting reaction mixture is relatively stable, and if desired the contained 1,1,1-difluorochloroethane may be recovered as such by commercially feasible methods without the taking place of further chlorination and its attendant production of further amounts of polychlorinated or other undesirable side reaction products. Thus, the following reaction—

Equation 3

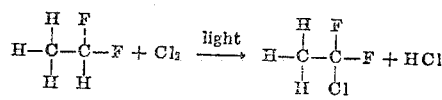

goes to a point at which the recoverable reacted materials contain by weight e. g. 80–85% and up of 1,1,1-difluorochloroethane, regardless of the presence of a substantial excess of available chlorine.

If desired, Stage 1 may be carried out in accordance with Equation 3, i. e. using one molecular proportion of chlorine. In this situation, it will be understood that substantially all the chlorine is used to monochlorinate the ethylidene fluoride, and that whatever chlorine may be needed in the rest of the process is introduced as the gas stream passes into Stage 2. However, use of a single molecular proportion of chlorine in Stage 1 affords no advantage, and ordinarily substantially more than one molecular proportion is employed and preferably all the chlorine used in the entire process is introduced into the system at the head end of Stage 1. Carrying out of the reaction of Stage 1 in the presence of a substantial excess of chlorine over that needed to monochlorinate the ethylidene fluoride has an advantage of insuring at least monochlorination of all of the ethylidene fluoride, and avoids the possibility of ethylidene fluoride as such entering Stage 2. If any material quantities of ethylidene fluoride were introduced into Stage 2, because of the high temperatures therein, HF would split out of the ethylidene fluoride, HF would be lost and undesirable side reactions effected. As indicated by Equations 1 and 3, the ethylidene fluoride monochlorinates to 1,1,1-difluorochloroethane predominantly. However, it will be understood that in accordance with the present invention it is not of major importance which hydrogen of the ethylidene fluoride is substituted by chlorine, it only being important, as far as successful operation is concerned, that at least one of the hydrogens of the ethylidene fluoride be substituted by chlorine.

As previously indicated, it is immaterial whether the actinic radiation reaction of Stage 1 is carried out in the presence of one or substantially more than one molecular proportion of chlorine. It is this inherent characteristic of the actinic radiation reaction of Stage 1 which affords the substantial advantage of putting all the chlorine used in the entire process into the gas stream as the latter enters Stage 1, and which makes operatively convenient the conjunctive use of the actinic radiation of Stage 1 and the final thermal chlorination of Stage 2. Since the operation of Stage 2 is such as to effect complete substitution of hydrogen whether the materials entering Stage 2 are mono or partly polychlorinated, it will be appreciated that in practicing Stage 1 operation need not be limited strictly to production of 1,1,1-difluorochloroethane, and the degree of chlorination effected and the time of retention of the reactants in the reaction zone of Stage 1 may vary considerably. On the other hand, from the standpoint of plant capacity there is no particular advantage afforded by carrying out Stage 1 in such a way as to form any material amounts of polychlorinated intermediate product, and it is preferred to control Stage 1 so that only complete monochlorination of ethylidene fluoride is effected and so that the reaction product contains no appreciable amount of CCl$_3$CClF$_2$.

Stage 1 is readily adaptable to a continuous operation in which ethylidene fluoride and all of the chlorine used in the entire process are continuously introduced into a reaction zone, subjected therein to the action of actinic radiation, and the resulting reaction mixture continuously discharged from the reaction zone. When the raw materials are continuously introduced into the reaction zone of Stage 1, subjected to the action of actinic radiation therein, and the resulting reaction mixture continuously discharged, there is formed a reaction zone effluent gas mixture containing most of the ethylidene fluoride as 1,1,1-difluorochloroethane, minimum amounts of undesired side reaction products, and all of the unreacted chlorine.

The reaction of Stage 1 may be carried out conveniently by passing the starting materials into and through a glass enclosed reaction space, such as the annular space formed by surrounding a fluorescent light tube with a glass tube of larger diameter. Any form of light which effects chemical reaction may be employed, such as diffused daylight, infra-red rays, ultra violet rays, ordinary incandescent lamps, although fluorescent light is preferred.

In the practice of Stage 1, good conversion of ethylidene fluoride depends upon space velocity per hour (volumes of reactant gas at room temperature per volume of reaction chamber per hour), ethylidene fluoride to chlorine mol ratio, light intensity, temperature, and substantial absence of oxygen in the reaction mixture. The term "conversion" indicates the percentage by weight of starting material which reacts during the course of the reaction. Space velocity per hour should be preferably not more than 600 and ordinarily in the range of 200 to 300. For the reasons above indicated, in the preferred embodiments of the invention, substantially more than one molecular proportion and usually all of the chlorine needed in the entire process is employed. The reaction is exothermic although not highly so. In most operations, particularly using fluorescent light, temperature control of the reactors has been unnecessary, since temperatures automatically maintain themselves within the range from about room temperature to about 300° C. Should operations be of such character as to develop undue amounts of heat, any suitable cooling means to keep temperature below about 300° C. may be employed. The reaction proceeds in the presence of any amount of actinic radiation, although the speed of reaction appears to be directly proportional to the intensity of light. Oxygen inhibits the chlorination reaction, and in practice the process is carried out under conditions such that the reaction is effected in the presence of less than 0.1% by weight of oxygen based on the amount of ethylidene fluoride charged.

The exit gas from the reactor of Stage 1 contains chlorine, HCl, 1,1,1-difluorochloroethane, (B. P. minus 9.6), and smaller amounts of $CH_2ClCHF_2$, boiling at about 35° C., $CH_2ClCF_2Cl$ boiling at about 47° C., and $CHCl_2CHF_2$ boiling at about 60° C.

*Stage 2*

On completion of the reaction of Stage 1, the effluent gas thereof is treated in accordance with Stage 2 to effect exhaustive chlorination and chlorinolysis. For this purpose, the reaction products of Stage 1 may be introduced into a tubular reactor of suitable length. The reactor of Stage 2 is provided with an external heating jacket together with means for maintaining control of temperatures within the reactor. In Stage 2, the reaction should be preferably carried out in the absence of catalysts such as active carbon and compounds of silicon, and hence the reactor is preferably made of a neutral or non-catalytic material such as graphite.

Dichlorodifluoromethane is the preferred sought-for end product of the present process, and accordingly the reaction of Stage 2 is carried out in the presence of sufficient chlorine to obtain dichlorodifluoromethane. Yields of $CCl_2F_2$ from $CH_3CHF_2$ in excess of 60% of theory have been obtained in operations in which only about 3.2 molecular proportions of chlorine were introduced into the reactor of Stage 2. However, it has been found that in order to obtain good yields of $CCl_2F_2$ and $CCl_4$ and to avoid any appreciable splitting out of HF, not less than 3.5 molecular proportions of chlorine should be charged into Stage 2. For the best overall results, it is preferred to use in Stage 2 about 4 molecular proportions of chlorine, which quantity of chlorine may be readily supplied to Stage 2 when Stage 1 is carried out in the presence of about 5 molecular proportions of chlorine.

The second important control factor in the practice of Stage 2 is temperature. We find that exhaustive chlorination and chlorinolysis may be effected by maintaining temperatures in the Stage 2 reactor at preferably not less than 750° C. and not more than 950° C. While some chlorinolysis takes place at temperatures above 550° C., temperatures of about 750° C. and up more adequately initiate and maintain substantial chlorinolysis. Further, we have determined that when working with minimum reactor temperature of about 750° C., the Stage 2 reactor tail gas contains practically no $CCl_3CF_2Cl$ which feature affords the important operating advantage of avoiding the necessity for recovering from the tail gases $CCl_3CF_2Cl$ and recycling the same through the reactor. Preferred operating temperatures lie within the range of 750–850° C. Temperatures above about 950° C. serve no useful purpose and should be avoided to prevent un- necessary decomposition and loss of HF. When operating the reactor of Stage 2 in the preferred temperature range of 750–850° C., and maintaining in the gas stream entering the reactor not less than 3.5 molecular proportions of chlorine, yields of $CCl_2F_2$ from $CH_3CHF_2$ in excess of 65% of theory may be obtained.

Assuming the presence of sufficient chlorine to substitute for all of the hydrogen atoms of the intermediate reaction product of Stage 2 and to support chlorinolysis, exhaustive chlorination and chlorinolysis in the reactor of Stage 2 take place with great rapidity, and the gas stream may be passed through the Stage 2 reactor at any suitable rate. Although when working at close to maximum temperatures, space velocities per hour might be as high as 6600–7000, at reaction temperature of about 850° C., a space velocity per hour of about 3000 is a practical maximum. At temperatures of about 775° C., space velocity per hour of around 500 is about optimum, but may be increased to about 1000 with slight loss of efficiency.

The exit gas of Stage 2 comprises—$CF_2Cl_2$ (B. P. minus 30° C.); $CCl_3F$ (B. P. plus 23.8° C.); $CCl_4$ (B. P. 77° C.); $C_2Cl_4$ (B. P. 122° C.), and some $C_2Cl_6$ (melts and sublimes at about 183° C.) plus HCl and usually some unreacted chlorine. Such a gas may be treated in any suitable way to recover the desired products. For example, the gas stream may be water-washed to remove most of the hydrochloric acid, washed with a mild NaOH solution to remove chlorine and the last traces of HCl, and finally dried as by use of calcium chloride or silica gel. The exit gas of the drying step comprises principally $CF_2Cl_2$, $CCl_3F$, $CCl_4$, and some $C_2Cl_4$. If desired, such gas stream may be cooled to, say, zero degrees C. to condense $CCl_3F$, $CCl_4$ and $C_2Cl_4$ and permit recovery of $CF_2Cl_2$ in the form of gas. Thereafter the liquid mixture of $CCl_3F$, $CCl_4$ and $C_2Cl_4$ may be distilled to separate and recover these materials individually. Any of the higher boiling reaction products collecting in the water and/or NaOH scrubbers may be recovered by suitable decantation and distillation operations.

The 1,1,1-difluorochloroethane used in Stage 2 may be prepared by methods other than actinic radiation. For example, methyl chloroform may be fluorinated using antimony trifluoride as the fluorinating agent to accomplish replacement of 2 of the chlorine atoms in the methyl chloroform by fluorine; similarly, methyl chloroform may be fluorinated using anhydrous hydrofluoric acid as a fluorinating agent.

Following is an example of practice of the invention: Ethylidene fluoride and chlorine in gaseous form were fed from their respective containers in molar ratio of 1:5.0 to 1:5.1, intimately mixed and introduced into a Stage 1 reactor which consisted of the annular space formed by the wall of a tubular fluorescent lamp and a cylindrical glass jacket surrounding same. Space velocity per hour of the gas mixture through the reactor was about 160–200. The 1,1,1-difluorochloroethane tail gases of the reactor of Stage 1 were passed directly to the Stage 2 reactor which consisted of a graphite tube of such length and diameter that the gases were passed through such reactor at space velocity per hour of about 500 S. V. H. The graphite tube was provided with a jacket whereby heat was applied and temperature maintained in the tube was about 760–775° C. The tail gas was scrubbed with water to remove the hydrogen chloride, and with alkali solution to remove excess chlorine, dried and cooled sufficiently to liquefy $CF_2Cl_2$, $CCl_3F$, $CCl_4$, and $C_2Cl_4$. The resulting liquor was fractionally distilled to recover $CCl_2F_2$ and $CCl_3F$ individually. The high boiling residue from the still was combined with heavy liquid product which collected in the base of the scrubbers, and after washing with alkali to remove acidity and drying, the mass obtained was distilled to recover the $CCl_4$ and $C_2Cl_4$ fractions separately. A small residue of higher boiling materials remained in the still. Raw materials charged: 719 parts by weight of ethylidene fluoride and 3933 parts chlorine. Products recovered: 1000 parts $CCl_2F_2$, 358 parts $CCl_3F$, 341 parts $CCl_4$ and 570 parts $C_2Cl_4$. Residue remaining: 72 parts.

We claim:

1. The process which comprises heating an at least monochlorinated 1,1-difluoroethane at temperature not less than 750° C. and not more than 950° C. in the presence of at least sufficient chlorine to form dichlorodifluoromethane.

2. The process which comprises heating 1,1,1-difluorochloroethane at temperature above 550° C. and not more than 950° C. in the presence of at least sufficient chlorine to form dichlorodifluoromethane.

3. The process which comprises heating an at least monochlorinated 1,1-difluoroethane at temperature not less than 750° C. and not more than 950° C. in the presence of at least 3.5 molecular proportions of chlorine to thereby form dichlorodifluoromethane and carbon tetrachloride simultaneously.

4. The process which comprises heating 1,1,1-difluorochloroethane at temperature not less than 750° C. and not more than 950° C. in the presence of at least 3.5 molecular proportions of chlorine to thereby form dichlorodifluoromethane and carbon tetrachloride simultaneously.

5. The process which comprises heating an at least monochlorinated 1,1-difluoroethane at temperature of 750–850° C. in the presence of at least four molecular proportions of chlorine to thereby form dichlorodifluoromethane and carbon tetrachloride simultaneously.

6. The process which comprises heating 1,1,1-difluorochloroethane at temperature of 750–850° C. in the presence of at least four molecular proportions of chlorine to thereby form dichlorodifluoromethane and carbon tetrachloride simultaneously.

7. The process which comprises subjecting a mixture of ethylidenefluoride and not less than five molecular proportions of chlorine to the action of actinic radiation to thereby form a resulting reaction mixture containing residual free chlorine and an intermediate product comprising 1,1,1,-difluorochloroethane, and heating said resulting mixture at temperature of not less than 750° C. and not more than 950° C. in the presence of said residual chlorine to thereby form dichlorodifluoromethane and carbon tetrachloride simultaneously.

8. The process which comprises continuously introducing ethylidene fluoride and not less than five molecular proportions of chlorine into a reaction zone, subjecting the material therein to the action of actinic radiation while maintaining temperature in the range from about room temperature to about 300° C. and space velocity per hour in the range of 200–300, continuously discharging the resulting reaction mixture from said zone to thereby recover a reaction mixture containing 1,1,1-difluorochloroethane and about four molecular proportions of residual free chlorine, continuously introducing said reaction mixture into a second reaction zone, and heating said mixture therein at temperature of 750–850° C. in the presence of said residual chlorine to thereby form dichlorodifluoromethane and carbon tetrachloride simultaneously.

9. The process which comprises heating at least monochlorinated ethylidene fluoride at temperature not less than 550° C. and not more than 950° C. in the presence of at least sufficient chlorine to form dichlorodifluoromethane.

10. The process which comprises subjecting to actinic radiation a mixture of ethylidene fluoride and sufficient chlorine to ultimately form dichlorodifluoromethane under conditions to produce a resulting reaction mixture containing residual free chlorine and at least monochlorinated ethylidene fluoride, and heating said resulting reaction mixture at temperature not less than 550° C. and not more than 950° C. in the presence of said residual chlorine to thereby form dichlorodifluoromethane.

11. The process which comprises heating an at least monochlorinated 1,1-difluoroethane at temperature not less than 550° C. and not more than 950° C. in the presence of at least sufficient chlorine to form dichlorodifluoromethane.

JOHN D. CALFEE.
LEE B. SMITH.

REFERENCES CITED

The following references are of record in the file of this patent:

UNITED STATES PATENTS

| Number | Name | Date |
|---|---|---|
| 2,007,208 | Midgley et al. | July 9, 1935 |

OTHER REFERENCES

Henne et al. "J. A. C. S." vol. 58, pages 889–890 (1936).